May 18, 1926.
J. W. SUPORTER
AUTOMOBILE BUMPER
Filed June 2, 1924
1,585,213
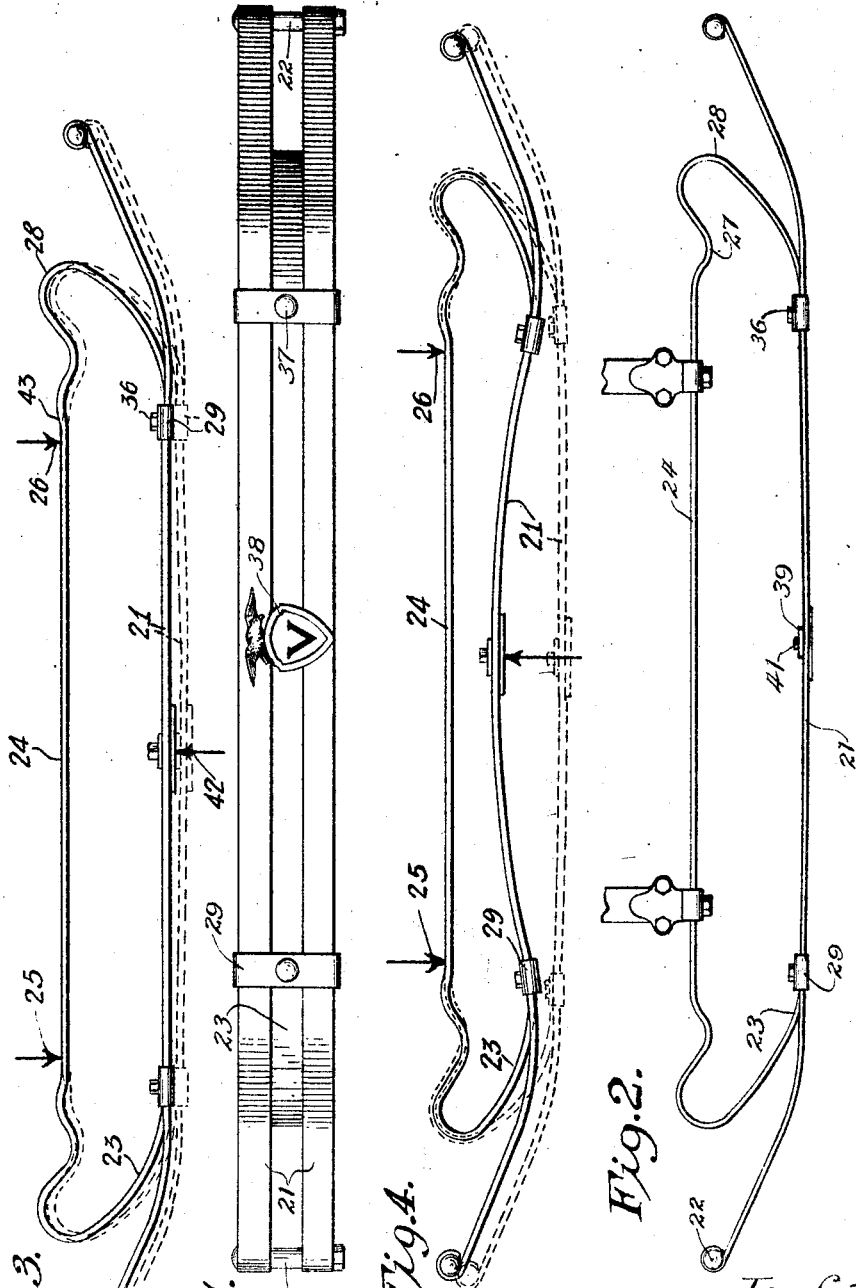
Inventor:-
James W. Suporter
By- Munday, Clarke + Carpenter
Attys Patented May 18, 1926.

1,585,213

UNITED STATES PATENT OFFICE.

JAMES W. SUPORTER, OF CHICAGO, ILLINOIS, ASSIGNOR TO VOLATOR COMPANY, OF CHICAGO, ILLINOIS, A CORPORATION OF ILLINOIS.

AUTOMOBILE BUMPER.

Application filed June 2, 1924. Serial No. 717,205.

My invention relates to automobile bumpers and in particular to an improvement therein which is designed to better absorb the shocks received in service, and which adds materially to the wearing qualities of the bumper.

A principal object of the invention is the provision of a spring bumper so constructed as to give a maximum of strength in the transverse bumper bars while, at the same time, providing adequate resiliency.

A further object is the provision of a clamping device for securing the bumper bars to a supporting brace in such manner that said bars are in no way weakened at the points of attachment.

Numerous other objects and advantages of the invention will be apparent as it is better understood from the following description, which, taken in connection with the accompanying drawings, discloses a preferred embodiment thereof.

Referring to the drawings,

Figure 1 is a front elevation of an automobile bumper in which my invention is embodied;

Fig. 2 is a top plan view thereof;

Fig. 3 is a similar view, showing the initial movement of the parts under stress of impact;

Fig. 4 is a like view, showing the action of the parts under further stress; and The bumper shown in the drawings for purposes of illustration, comprises a pair of transverse bumper bars 21, which are connected at their ends by means of bolts 22 and which are secured intermediate their ends to forwardly bent portions 23 of a spring brace 24.

Said brace, throughout the greater part of its length, is straight and is adapted to be attached to a forward part of the car in any suitable manner, substantially at the points indicated by the arrows 25 and 26 in Figs. 3 and 4. Beyond the points of attachment just referred to, said brace is curved to form forwardly extending humps 27, beyond which the material is bent back to points disposed rearwardly of the straight transverse portion of the brace and thence turned forwardly and back to parallel position with respect to said straight portion of the brace, forming rounded ends 28.

The bumper bars are secured to the forward extension 23 of the brace 24 by means of a clamping device 29. There are two of said clamps in the present instance.

An ornament 38 may be positioned upon the front of the bumper bars at the center and held in place in any suitable manner, as by a plate 39 and nut 41 threaded onto a bolt extending rearwardly from the ornament.

Referring now to Figs. 3 and 4, the action of the bumper under stress may be observed. The bumper bars 21 are slightly bowed forwardly, intermediate the clamps 29, and upon receiving a blow from the front, at a point indicated by the arrow 42, said bars are first straightened out, moving from the dotted line position to the full line position of Fig. 3, and the curved ends of the brace member 24 are also moved from the dotted line to the full line position, as shown in said Fig. 3. Thus it appears that the entire movement is rearwardly up to this point and the brace is flexed in rearward direction at the point indicated by the reference character 43.

Further stress upon the bumper bars in the direction of the arrow 42 will tend to flex the bowed ends 28 of the brace 24 forwardly to the full line position of Fig. 4, the dotted line position in said figure being the same as that of Fig. 3, which is the position prior to the application of stress. Thus the bowed ends 28 are flexed in both directions, first rearwardly and then forwardly and, for this reason, they will withstand greater shocks and will last longer without breakage than will the ordinary brace which is flexed in one direction only.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A spring bumper for automobiles, comprising transverse bumper bars, and a spring brace attachable to a forward part of the car and having its ends bowed forwardly to points of attachment to said pumper bars, said bars being slightly bowed intermediate said points of attachment and the bowed ends of said brace being adapted to be flexed first rearwardly and then forwardly under stress upon the bumper bars.

2. A spring bumper for automobiles, comprising transverse bumper bars, and a spring brace attachable to a forward part of the car and having its ends bowed forwardly to points of attachment to said bumper bars, said bars being slightly bowed intermediate said points of attachment and the bowed ends of said brace being adapted to be flexed successively in opposite directions under stress upon the bumper bars.

3. A spring bumper for automobiles, comprising transverse bumper bars, and a spring brace attachable to a forward part of the car and having its ends bowed forwardly to points of attachment to said bumper bars, said bars being slightly bowed intermediate said points of attachment and the direction of stress upon the bowed ends of said brace being reversed when stress upon said bars moves them a predetermined distance from normal position.

JAMES W. SUPORTER.